US006241101B1

(12) United States Patent
Roodenrijs

(10) Patent No.: US 6,241,101 B1
(45) Date of Patent: Jun. 5, 2001

(54) INSTALLATION FOR SEPARATING AND PURIFYING SOLIDS

(75) Inventor: Jacobus Petrus Roodenrijs, Michielsgestel (NL)

(73) Assignee: Niro Process Technology B.V., AG 's-Hertogenbosch (NL)

(*) Notice: Subject to any disclaimer, the term of this patent is extended or adjusted under 35 U.S.C. 154(b) by 0 days.

(21) Appl. No.: 09/204,061
(22) Filed: Dec. 3, 1998

(30) Foreign Application Priority Data

Dec. 3, 1997 (NL) .................................................... 1007687

(51) Int. Cl.$^7$ .................................................. B01D 33/01
(52) U.S. Cl. ...................... 210/388; 210/390; 210/398; 422/261
(58) Field of Search ............................. 210/388, 389, 210/390, 398; 422/261, 269; 423/658.5

(56) References Cited

U.S. PATENT DOCUMENTS

| 1,509,686 | 9/1924 | Morterud | 423/658.5 |
| 3,374,052 | * 3/1968 | Fan et al. | 210/661 |

FOREIGN PATENT DOCUMENTS

| 2 300 576 | 11/1996 | (GB) . |
| 7 106 457 | 12/1971 | (NL) . |

* cited by examiner

Primary Examiner—Ivars Cintins
(74) Attorney, Agent, or Firm—Sughrue, Mion, Zinn, Macpeak & Seas, PLLC

(57) ABSTRACT

An installation for separating and purifying solids from a suspension and/or for leaching out solid particles has a cylinder and a piston movable therein. A sealing part of the piston is in contact with the interior wall of the cylinder. A filter is positioned some distance away from the sealing part of the piston. A discharge chamber is located between the filter and the sealing part of the piston. A pump chamber is formed below the sealing part of the piston and a washing column chamber containing a packed bed of solid particles is formed above the filter. During a downward pump stroke of the piston, suspension is forced, via at least one connecting channel between the pump chamber and the washing column chamber, to the washing column chamber. During a compression stroke, liquid is brought via the filter to the discharge chamber and discharged via a discharge line. Solid particles, such as crystals, remain behind on the filter and are compressed against the packed bed. The connecting channel can be located inside the cylinder. In that case the piston has a conical jacket with a streamlined non-return valve. The connecting channel between pump chamber and washing column chamber can also be located outside the cylinder. The installation has relatively simple seals and feed and discharge lines fixed to the cylinder in a stationary position. The installation can also be scaled up easily.

11 Claims, 4 Drawing Sheets

INSTALLATION FOR SEPARATING AND PURIFYING SOLIDS

BACKGROUND OF THE INVENTION

The invention relates to an installation for separating and purifying solids from a suspension and/or for leaching out solid particles, containing:

a cylinder having a piston which is movable therein and which with a sealing part bears against an interior wall of the cylinder to provide a seal, a filter which is connected to the piston and which delimits a washing column chamber located above the filter in the cylinder.

a feed line for feeding the suspension of the solid particles to the cylinder and a discharge line for discharging the liquid from the washing column chamber after filtering through the filter.

An installation, or washing column, of this type is disclosed in Netherlands Patent Application no. 7 106 457 in the name of the Applicant. In said known installation, when the piston is in the lowermost position, the suspension of solid particles in a liquid is passed through the piston into the washing column chamber. A packed bed of particles, for example ice crystals, is located in the upper part of the washing column chamber. The piston is then displaced upwards until it comes into contact with the packed bed. During this operation the liquid is forced through the filter to a discharge line. The particles remain behind on the filter and add to the packed bed from the bottom. The packed bed is melted or scraped off at the top and the purified particles (ice crystals) are discharged from the washing column chamber.

A discontinuous piston washing column of this type has the disadvantage that the purification process is difficult to carry out on a large scale. Furthermore, the system of movable feed and discharge lines requires additional pneumatics and complex seals. Furthermore, it is difficult to scale up the known piston washing column.

SUMMARY OF THE INVENTION

An aim of the present invention is to provide a discontinuous packed bed washing column with which the purification process can be employed on a large scale and with which the number of moving parts is minimised.

To this end the installation according to the invention is characterised in that the piston in the cylinder delimits a pumping chamber which is locate below the piston and into which the feed line opens, wherein the filter is located some distance away in the axial direction from the sealing part of the piston so that a discharge chamber in the cylinder is delimited by the cylinder wall, the filter and the piston, wherein a connecting channel which can be closed off connects the pumping chamber and the washing column chamber and wherein the feed and discharge lines are at least virtually stationary with respect to the cylinder.

When the piston is in contact with the packed bed, the pumping chamber below the piston has filled with the suspension via the fixed feed line. For this operation the connecting channel between the pumping chamber and the washing column chamber is closed, for example via a non-return valve. The feed line is then shut off and the piston moves downwards in one pump stroke. For this operation the shut-off valve in the connecting channel is opened, so that during the compression stroke the suspension is transferred from the pumping chamber to the washing column chamber. The piston then moves upwards again towards the packed bed, the feed line and the discharge line being opened. The connecting channel is closed. The liquid from the suspension will be forced through the filter towards the discharge chamber, from where the liquid is able to flow away through the opened discharge line.

By use of the discharge chamber located between the filter and the piston and of the closable connecting channel between the pumping chamber and the washing column chamber it is possible for the feed and discharge lines to be attached to the cylinder in a fixed position. The advantages in respect of the ability to scale up the installation ensue from the fact that the diameter of the cylinder can be made many times larger, with only one fixed discharge line and one fixed feed line being required. The number of closable connecting channels can be increased independently thereof. Since there is still only one (rod) seal needed, said washing column can more easily be constructed to sanitary requirements. The risk of leakage to the outside (environment) and to the interior (air, sanitary requirements) is also appreciably less, as a result of which the need for filing under pressure can also be dispensed with.

Preferably, the discharge line opens into the discharge chamber, the distance between the filter and the piston being made such that the sealing part of the piston does not pass beyond the mouth of the discharge line when the piston is moved in the cylinder. In this way the liquid discharged via the filter during the compression stroke can be continuously removed from the discharge chamber.

However, although this is not to be preferred, it is also possible to fit the discharge line in an axial position such that said line is below the sealing part of the piston during the compression stroke. The discharge chamber will be filled during the compression stroke and will be emptied only when the piston has been moved down sufficiently for the discharge chamber to be re-connected to the discharge line. With this arrangement the volume of the discharge chamber must be made sufficiently large.

The connecting channel between the pumping chamber and the washing column chamber can be located in the cylinder, but can also run outside the cylinder in the form of a by-pass line. Preferably, the piston is constructed as a hollow body having an essentially conical wall and an open base. The filter is attached close to the top of the conical piston, where an opening is made in the cylinder wall which is closed off by a non-return valve. During the pump stroke, the suspension is directed in a streamline manner towards the opening. During this operation the liquid, such as water, is placed under pressure and the solid particles, such as ice crystals, are carried along to the washing column chamber.

If the solid particles are heavier than the liquid, the entire cylinder with the conical piston can be placed the other way up. During the cycle time of the washing column according to the present invention, which, for example, is one minute, the ice is able to float up or heavy crystals are able to settle out. The crystals or the ice must be transferred from the pumping chamber to the washing column chamber and must always be brought as close as possible to the non-return valve of the piston in order to ensure efficient removal from the pumping chamber. By placing the cylinder according to the invention the other way up for particles which are heavier than the liquid, said particles will always be located close to the non-return valve of the piston in the pumping chamber, so that blockage caused by these particles remaining behind is counteracted.

To prevent the packed bed from becoming disturbed during the pump stroke as a consequence of the introduction of the suspension into the washing column chamber, the valve is preferably of streamlined construction when an internal connecting channel is used. As a result of this the liquid flow is deflected in the horizontal direction during the pump stroke and the packed bed remains intact. The piston can be provided on the underside with ice-breaking elements, so that the piston movement is not blocked by ice formation during the pump stroke.

BRIEF DESCRIPTION OF THE FIGURES

A few embodiments of an installation according to the present invention will be explained in more detail with reference to the appended drawing. In the drawing.

DETAILED DESCRIPTION OF THE PREFERRED EMBODIMENTS

Figure 1:
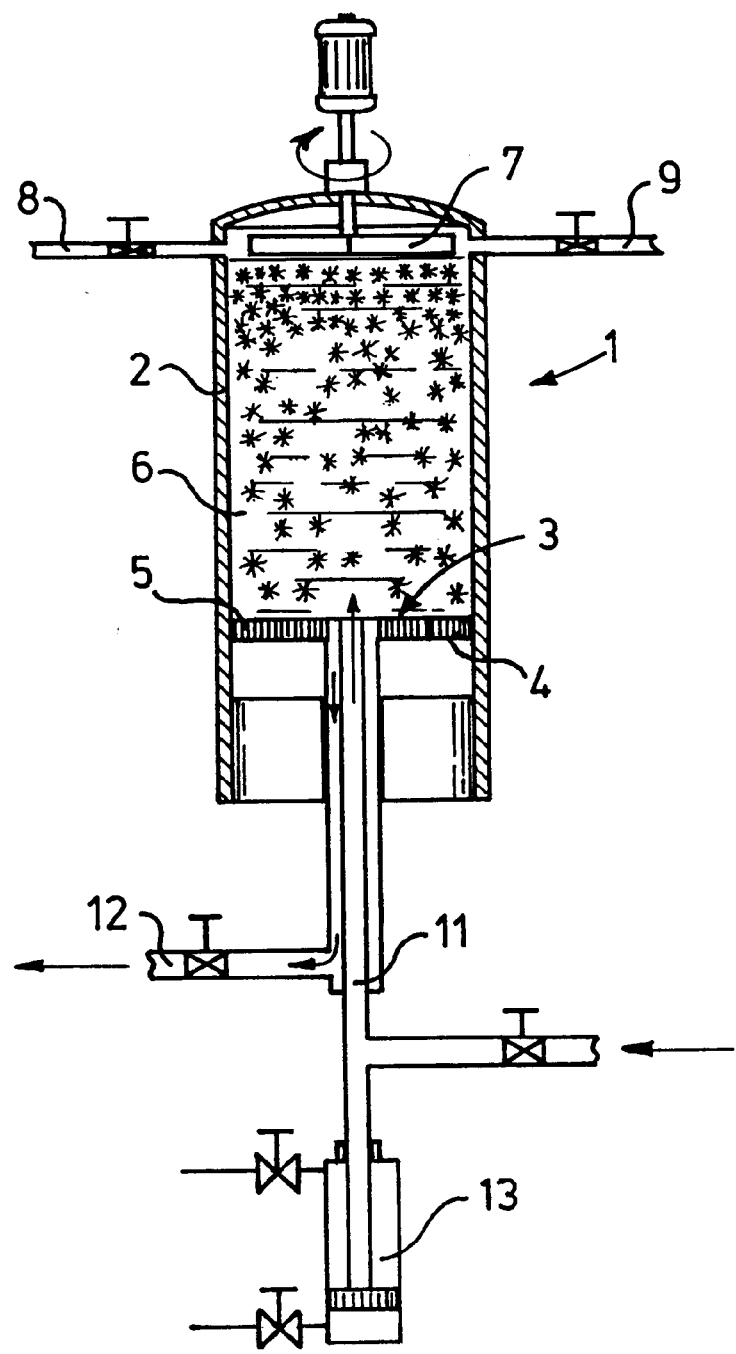
FIG. 1 shows a diagrammatic longitudinal section of a packed bed washing column according to the prior art which operates discontinuously.

FIG. 1 shows a packed bed washing column 1 which is provided with a cylinder 2 having a piston 3 which is movable therein. The piston 3 is constructed such that it is impermeable at the bottom 4 and is provided at the top with a filter 5. The filter 5 delimits, with the wall of the cylinder 2, a washing column chamber 6 in which a packed bed of solid particles, for example ice crystals, is located. A scraper 7, with which the packed bed is scraped off at the top and discharged via a first discharge line 8, is located at the top of the cylinder 2. A wash liquid, in which the scraped off particles are suspended before being pumped off via the discharge line 8, is fed in via a feed line 9.

The piston 3 is connected to a feed line 11 for feeding in the suspension of solid particles. A discharge line 12 for discharging the liquid after the latter has been forced through the filter 5 is fitted concentrically with the feed line 11.

The piston 3 and the feed and discharge lines 11 and 12 are driven by a hydraulic cylinder 13. In the lowermost position of the piston 3 the space between the packed bed in the cylinder 2 and the filter 5 is filled with the suspension via the feed line 11. The feed line 11 is then shut off and the discharge line 12 is opened. The piston 3 then moves upwards, as a result of which the liquid located above the piston is forced through the filter 5 and is discharged via the line 12. The crystals remaining behind on the filter 5 are passed against the crystal bed, which is compacted by the piston 3. The known washing column, which operates discontinuously, has the disadvantage that the displacement of the feed and discharge lines 11 and 12 with the piston demands a complex construction, in particular with regard to the seals. Furthermore, the known washing column cannot easily be used on a large scale. The diameter of the known washing columns is, for example, at most 35 cm, with a throughput of at most 0.5 m$^3$ per hour, whereas for many industrial applications nowadays a diameter of, for example, 120 cm is desired, with a throughput of 8 m$^3$/hour or more.

Figure 2:
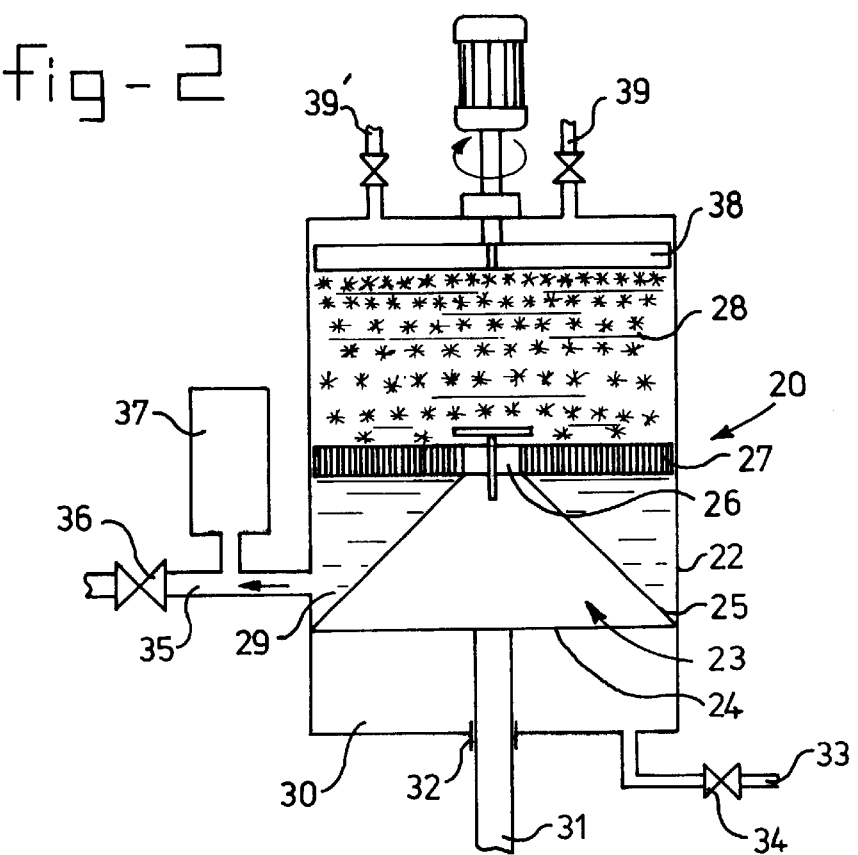
FIG. 2 shows a longitudinal section of a packed bed washing column according to the present invention with an internal, closable connecting channel between the pumping chamber and the washing column chamber.

FIG. 2 shows a discontinuous piston washing column 20 according to the invention, which operates without the complex drive and feed-through of the feed and discharge lines to the cylinder according to the prior art. The washing column 20 according to the present invention comprises a cylinder 22 with piston 23 therein. The piston 23 is open at the bottom 24 and has a conical jacket 25 which at the top opens into an opening 26. The opening 26 of the piston 23 is closed off by a non-return valve 40.

The bottom 24 of the piston 23 is in sealing contact with the inside wall of the cylinder 22. A filter 27 is fixed on the top of the piston 23. The filter 27 delimits, with the wall of the cylinder 22, a washing column chamber 28 in which a packed bed of solid particles is located. A discharge chamber 29 is delimited by the filter 27, the jacket 25 of the piston 23 and the wall of the cylinder 22. A pumping chamber 30 is formed below the sealing bottom 24 of the piston 23. The piston rod 31 extends through the pumping chamber 30 and is connected to hydraulic or pneumatic drive means, which are not shown in more detail. The passage for the piston rod 31 through the wall of the cylinder 22 is sealed by means of a rod seal 32, such as, for example, a commercially available O-ring or lip seal. A feed line 33, having a shut-off valve 34 therein, opens into the pumping chamber 30. A discharge line 35 provided with a shut-off valve 36 opens into the discharge chamber 29. An expansion chamber 37 having a volume which is at least equal to the volume that is taken up by the piston rod 31 inside the pumping chamber 30 is in open connection with the discharge line 35, upstream of the shut-off valve 36.

A scraper 38 for scraping off purified solid particles from the packed bed is suspended at the top of the washing column 28. A wash liquid, in which the scraped off particles are suspended before they are discharged via the discharge line 39, is fed to the top of the cylinder 22 via a feed line 39'.

In the position shown (end of the compression stroke), the packed bed in the washing column chamber 28 is compacted by the filter 27. The shut-off valve 36 is opened and the liquid present in the discharge chamber 29, which liquid has been forced out of the washing column chamber 28 through the filter 27 during the compression stroke, has been removed from the discharge chamber. The shut-off valve 34 has been opened and fresh suspension has been fed to the pumping chamber 30 from the feed line 33. The shut-off valve 34 in the feed line and the shut-off valve 36 in the discharge line are then closed and the piston 23 moves, together with filter 27, to the bottom of the cylinder 22. During this operation the non-return valve 40 is opened by the increasing pressure within the jacket 25 and the suspension flows from the pumping chamber 30 to the washing column chamber 28 via the opening 26 in the piston 23. Because the piston 23 is of conical construction, a flow is obtained such that the solid particles, in particular ice crystals, are entrained by the liquid flowing towards the washing column chamber 28. When the piston 23 has reached the lowermost position, the shut-off valves 34 and 36 are opened. During the subsequent compression stroke, the volume of the washing column chamber 28 is reduced and the liquid in the suspension located in said chamber is forced through the filter 27 to the discharge chamber 29, from where it is removed through the discharge line 35. During this operation the non-return valve 40 is closed. The packed bed in the washing column chamber is then compacted again for a predetermined time and the upper part of the bed is scraped off with the scraper 38 and the scrapings, suspended in the wash liquid, are discharged through the discharge line 39.

Figure 3:
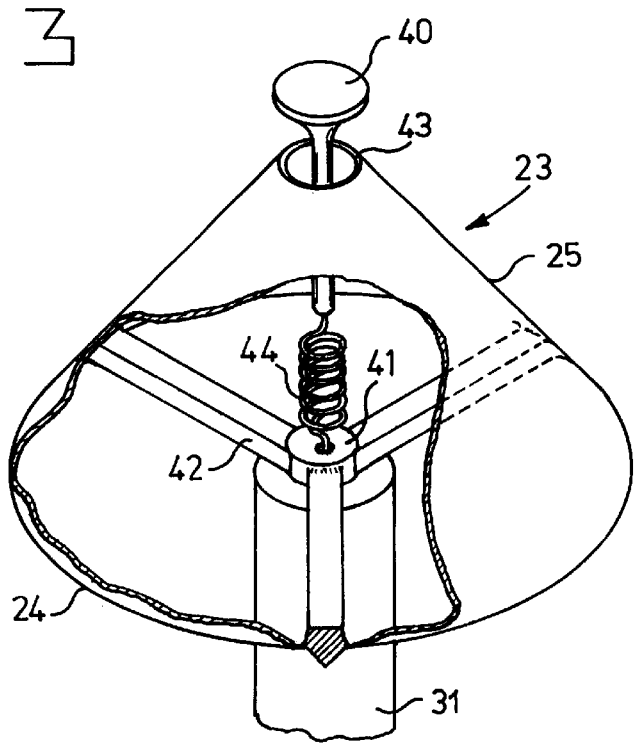
FIG. 3 shows a diagrammatic perspective view of the conical piston of the washing column according to FIG. 2.

FIG. 3 shows, diagrammatically, the shape of the piston 23 according to the present invention. On the underside or bottom 24 there is a central hub 41 which is connected via three spokes 42 to the jacket 25. The spokes 42 are provided on the bottom with ice-breaking elements in the form of a sharp edge. The truncated top of the jacket 25 forms a seat 43 for the valve 40. The valve 40 is of streamlined construction such that, when it is opened during the pump stroke of the piston 23, the suspension which is fed in via the interior of the piston 23 is laterally deflected by the valve and does not disturb the build-up of the packed bed which is located above the piston 23. The valve 40 can be connected to the central hub 41 via a spring 44. The build-up of pressure in the pumping chamber 30 at which the valve 40 opens can be adjusted by varying the stiffness of the spring 44.

Figure 4:
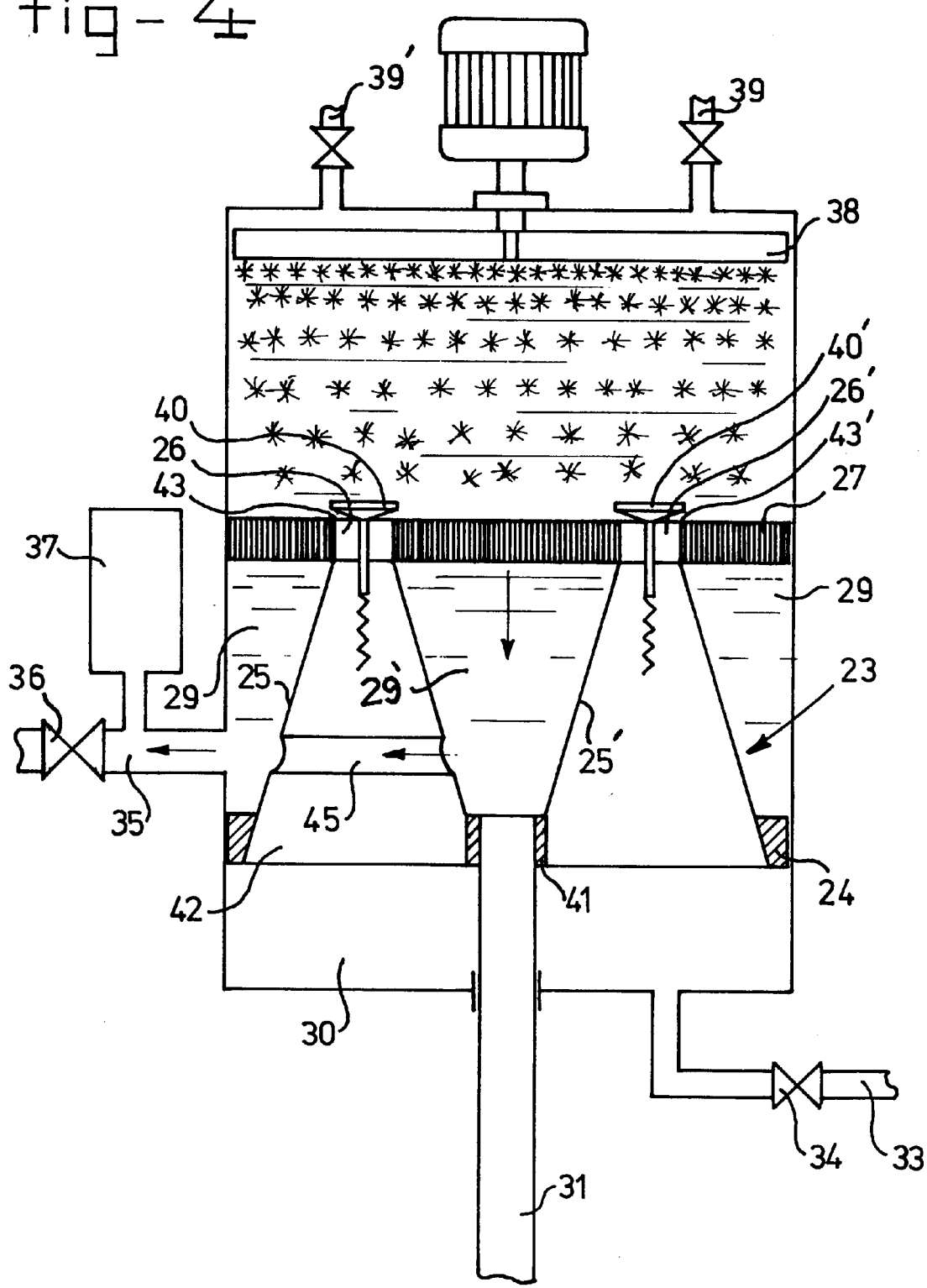
FIG. 4 shows a diagrammatic longitudinal section of a packed bed washing column according to the present invention with two internal connecting channels.

FIG. 4 shows an embodiment in which the piston 23 comprises an inner conical jacket 25' and an outer conical jacket 25. The top of the inner conical jacket 25' is an contact with the piston and rod 31. The base of the conical jacket 25' is connected to the filter 27. The top section of the outer conical jacket 25 is connected to the filter 27, whilst the base edge of the outer conical jacket 25 forms a sealing part 24 which bears against the cylinder wall. A number of passages 26, 26' have been made between the inner and outer conical jackets 25', 25, each of which is provided with a respective seat 43, 43' and which is closed off by a respective non-return valve 40, 40'. The discharge chamber is divided by the inner and outer conical jackets 25, 25' into an outer discharge chamber 29, which is delimited by the outer conical jacket 25 and the cylinder wall, and an inner discharge chamber 29', which is delimited by the inner conical jacket 25'. The discharge chambers 29, 29' are connected to one another via a coupling line 45 which joins openings in the inner and outer jackets 25', 25 to one another. The number of coupling lines 45 corresponds to the number of non-return valves 40, 40' and can be varied depending on the desired throughput.

The illustrative embodiment shown in FIG. 4 demonstrates that scale-up of the installation can be effected easily by increasing the number of passages 26, 26' each provided with its own non-return valve 40, 40'. In the case of a scale-up of this type only the diameter of the cylinder 22 has to be increased, whilst the number of feed and discharge channels 33, 35 and the number of piston rods 31 remains the same.

Figure 5A:
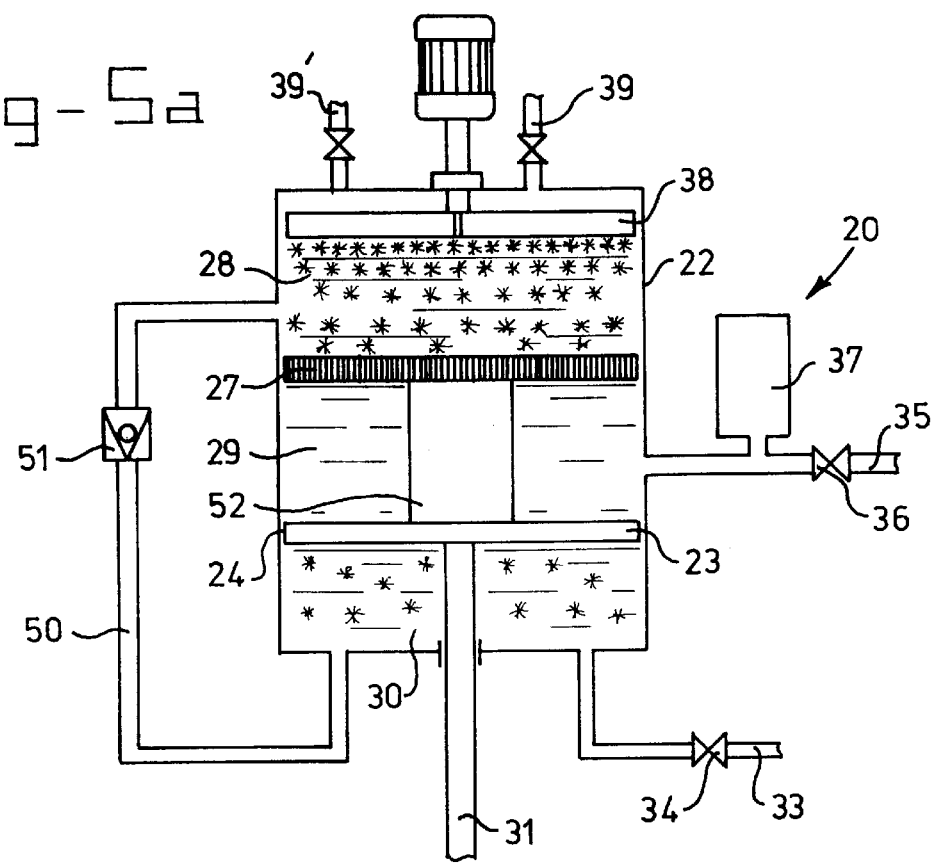
FIG. 5a shows a diagrammatic longitudinal section of a packed bed washing column provided with an external connecting channel between the pumping chamber and the washing column chamber.

FIG. 5a shows an embodiment of a washing column 20 which operates in accordance with the same principle as the washing column shown in FIG. 2, but with which an external connecting channel 50 having a shut-off element 51 is used. The components in FIG. 4 which correspond to those in FIG. 2 are provided with the same reference numerals. During the pump stroke of the piston 23 the suspension is pumped from the pumping chamber 30 via the line 50 to the washing column chamber 28. Because the flow of the suspension takes place outside the cylinder 22, the conical construction of the piton 23 is not necessary in this case. By means of a spacer 52, the filter 27 is fitted some distance away from the piston 23 so that the discharge 29 is formed. During the compression stroke the shut-off element 51 prevents suspension from being able to be forced via the line 50 to the pumping chamber and the liquid is transported to the discharge chamber 29. In other respects functioning is the same as that which has been described with regard to FIG. 2.

Figure 5B:
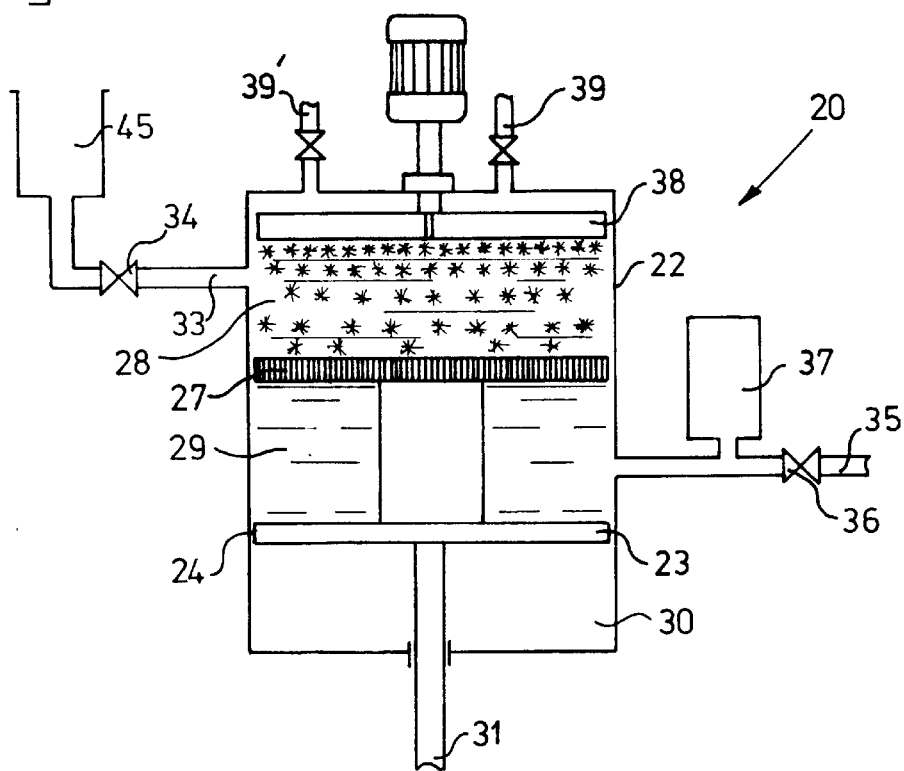
FIG. 5b shows a diagrammatic longitudinal section of a further embodiment of a packed bed washing column.

FIG. 5b, finally, shows an embodiment of the installation according to the present invention in which the feed line 33 opens into the washing column chamber 28. During a fill stroke, crystals are fed directly from a container 45 to the washing column chamber, the piston 23 moving into its lowermost position. During the compression stroke, during which the piston moves upwards, the shut-off valve 34 is closed and the shut-off valve 36 is opened, so that the liquid is removed via the filter 27 through the discharge line 35. The space 30 below the piston 23 has no further function in this embodiment.

It will be clear to a person skilled in the art that variants of the principles of the piston washing column described above fall within the scope of the present invention. For example, instead of a scraper 38 it is also possible to use heating elements in order to discharge the packed crystal bed in the melted state. It is also possible to take the piston rod 31 through the washing column chamber 28 instead of through the pumping chamber 30. Furthermore, the washing column can be used in combination with crystallisation installations which are known per se, in which case a throughput of, for example, 30 tonne per hour or more can be achieved.

What is claimed is:

1. Installation for separating and purifying solids from a suspension and/or for leaching out solid particles, comprising:
    a cylinder (22) having a piston (23) which is movable therein and which has a sealing part (24) which bears against an interior wall of the cylinder to provide a seal,
    a filter (27) connected to the piston and which delimits a washing column chamber (28) located above the filter in the cylinder,
    a feed line (33) for feeding the suspension of the solid particles to the cylinder and a discharge line (35) for discharging the liquid from the washing column chamber after filtering through the filter, wherein:
        the piston and the cylinder delimit a pumping chamber (30) located below the piston and into which the feed line opens,
        the filter is spaced in the axial direction from the sealing part of the piston so that a discharge chamber (29) in the cylinder is delimited by the cylinder wall, the filter and the piston,
        at least one closeable connecting channel (26;50) connects the pumping chamber and the washing column chamber, and
        the feed and discharge lines are at least virtually stationary with respect to the cylinder.

2. Installation according to claim 1, wherein the discharge line opens into the discharge chamber, and an axial distance between the filter and the sealing part of the piston (23) is such that the sealing part does not pass beyond a mouth of the discharge line when the piston has reached an end of a compression stroke.

3. Installation according to claim 1 wherein the connecting channel is located in the cylinder and comprises a passage through the piston which passage is provided with a non-return valve (40).

4. Installation (20) according to claim 1, wherein the connecting channel comprises a line (50) located outside the cylinder.

5. Installation according to claim 1, characterised in that the piston comprises a first hollow body having an essentially conical wall (25) and an open base.

6. Installation according to claim 5, wherein the piston has at least one opening at the top of the essentially conical wall, and a non-return valve (40) is disposed in said opening.

7. Installation according to claim 6, wherein the valve is configured to laterally deflect inflowing suspension.

8. Installation according to claim 5, wherein the piston is provided on a bottom thereof with ice-breaking elements.

9. Installation according to claim 5, wherein the piston comprises a second hollow body having an essentially conical wall (25'), which is located inside the first body with a base proximate the top of the first body, wherein a plurality of passages connect the pumping chamber and the washing column chamber and each passage is closeable by a respective non-return valve (40, 40').

10. Installation according to claim 9, wherein conical walls (25, 25') are each provided with an opening, which openings are connected to one another by a coupling line (45).

11. Installation (20) for separating and purifying solids from a suspension and/or for leaching out solid particles, comprising:
- a cylinder (22) having a piston (23) which is movable therein and which has a sealing part (24) which bears against an interior wall of the cylinder to provide a seal,
- a filter (27) connected to the piston and which delimits a washing column chamber (28) located above the filter in the cylinder,
- a feed line (33) for feeding the suspension of the solid particles to the cylinder and
- discharge line (35) for discharging the liquid from the washing column chamber after filtering through the filter, wherein:
  - the piston delimits a space located above the piston in the cylinder, in which space the filter is spaced from the sealing part of the piston,
  - a discharge chamber (20) is delimited in the cylinder by the cylinder wall, the filter and the piston,
  - the feed line opens into the washing column chamber and
  - the feed and discharge lines are at least virtually stationary with respect to the cylinder.

* * * * *